July 17, 1923.
E. A. WAGNER
ELECTRICALLY HEATED TOOL
Filed Dec. 5, 1921
1,462,431
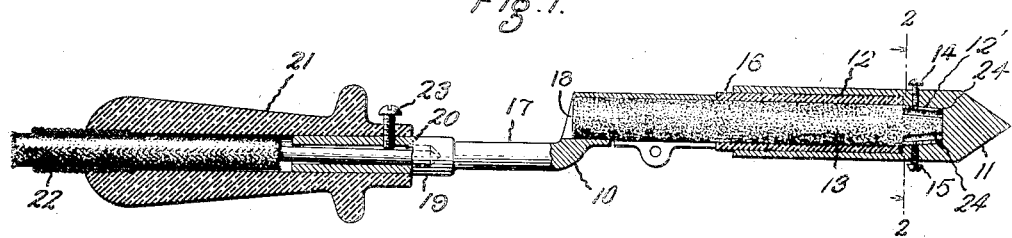
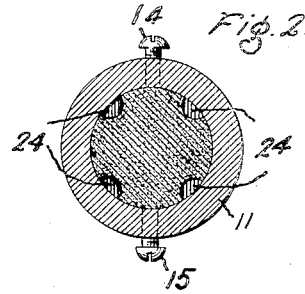
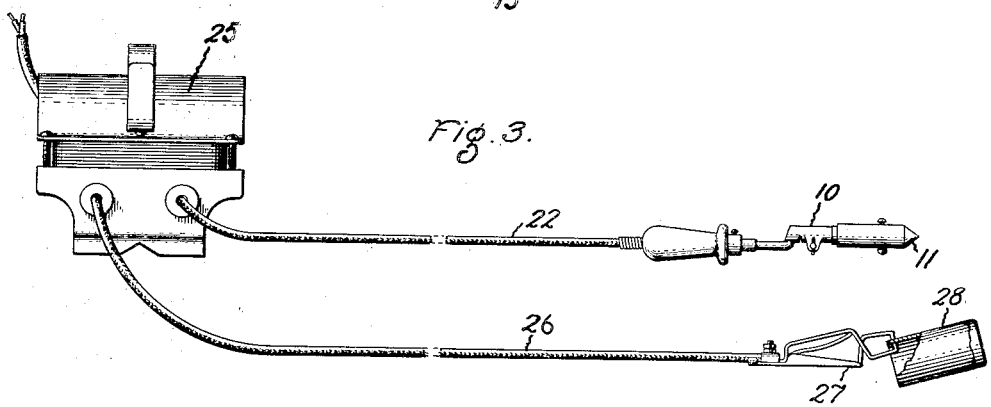
Inventor:
Edward A. Wagner,
by (signature)
His Attorney.

Patented July 17, 1923.

1,462,431

UNITED STATES PATENT OFFICE.

EDWARD A. WAGNER, OF FORT WAYNE, INDIANA, ASSIGNOR TO GENERAL ELECTRIC COMPANY, A CORPORATION OF NEW YORK.

ELECTRICALLY-HEATED TOOL.

Application filed December 5, 1921. Serial No. 519,876.

*To all whom it may concern:*

Be it known that I, EDWARD A. WAGNER, a citizen of the United States, residing at Fort Wayne, in the county of Allen, State of Indiana, have invented certain new and useful Improvements in Electrically-Heated Tools, of which the following is a specification.

My invention relates to electrically heated tools and has for its object the provision of simple, reliable and economical means for electrically heating tools.

More specifically my invention relates to electrically heating soldering irons, although it obviously has application in the heating of various other tools.

In carrying out my invention, in one form thereof I employ a rod made of suitable resistance material, such as carbon, one end of which is secured to a handle while the other end carries a copper soldering point. The end of the rod adjacent the soldering point is reduced in cross section for the purpose of increasing its resistance at this point. In the operation of the soldering iron an electric current is passed through the rod and the soldering point, the electric circuit being closed upon the application of the soldering point to the work. The electric current rapidly heats the portion of the rod adjacent the soldering point to a high temperature, the heating effect being localized at this point by reason of the increased resistance of this portion of the rod. The heat generated in the high resistance section of the rod is conducted rapidly to the useful portion of the soldering point.

For a more complete understanding of my invention reference should be had to the accompanying drawing in which Fig. 1 is a view partially in section showing a soldering iron constructed in accordance with my invention; Fig. 2 is an enlarged section view along the line 2—2 of Fig. 1 looking in the direction of the arrows, while Fig. 3 shows a convenient arrangement for the use of the soldering iron.

Referring to the drawing, the soldering iron 10 constructed in accordance with one form of my invention is provided with a cylindrical copper soldering point 11 having a relatively large longitudinal opening 12 leading into which is a small longitudinal opening 12' concentric therewith. Opening 12' is shorter than opening 12, slightly tapered toward its inner end, and is adjacent the useful portion of the soldering point. A resistance rod 13 forming a heating element, made of a suitable heat refractory resistance material, such as carbon, extends longitudinally of opening 12 and is seated snugly in opening 12'. The inner end of the resistance rod is slightly tapered for a short distance to correspond with the size and shape of opening 12' so as to fit closely in engagement with the soldering point. The resistance rod is secured in opening 12' by means of clamping screws 14 and 15. Closely fitting in opening 12 and around the resistance rod is a cylindrical insulator or jacket 16, formed of a suitable insulating material such as mica. This insulator besides electrically insulating the adjacent portions of the soldering point and the resistance rod prevents the access of air to the adjoining portions of the soldering point and the rod, thus preventing oxidation in these parts which operate at high temperatures. The insulator 16 is of such length that it projects from opening 12 for a short distance.

The resistance rod is secured to a metallic member 17 having an opening 18 into which the left hand end of the rod is inserted, until the end of insulator 16 is engaged, in which position it is held in place by a suitable clamping screw. By means of the projecting end of insulator 16, member 17 is maintained in insulated relation with the soldering point. Member 17 extends parallel with the resistance rod and is provided at its opposite end with an enlarged portion 19 having a central bore 20. A handle 21 having a longitudinal opening into which portion 19 is inserted is mounted on the end of member 17. An insulated electric conductor 22 having its end exposed is inserted in the outer end of the handle, extended through the handle, and the exposed end seated in bore 20. A screw 23 is threaded transversely through the handle and portion 19 into engagement with the conductor 22. This arrangement provides a very simple and reliable mechanical connection between the handle, the conductor, and the member 17, and by means of which the conductor is held in electrically conducting relation with the member 17.

In order to localize the generation of heat by virtue of the resistance of the rod at a point adjacent the soldering point, the resistance of the portion of the rod seated in opening 12' in the soldering point is increased. This is effected by providing the rod with four circumferentially spaced longitudinally extending grooves 24 extending the length of that portion of the rod seated in opening 12'. By means of the grooves, the cross sectional area of this portion of the rod is decreased, whereby its resistance is increased.

In the application of my invention, it is contemplated that conductor 22 will lead to a suitable source of low voltage supply, such as a transformer 25. The opposite terminal of the transformer is connected by means of conductor 26 to a clip 27. The clip is adapted to be temporarily secured in electrically conducting relation with the work. After the clip has been thus secured to a work piece 28, in order to heat the soldering point, handle 21 is grasped by the operator and the soldering point brought into engagement with the work piece. This closes a circuit from the transformer through conductor 26, clip 27, work piece 28, soldering point 11, resistance rod 13, member 17, and conductor 22 back to the transformer. Upon thus closing the electric circuit, the high resistance portion of the rod seated in the soldering point is heated to a high temperature and this heat is rapidly conducted to the useful portion of the soldering point. Since the generation of heat is localized near the useful portion of the soldering point, the heat is efficiently conducted to the working surface. By means of jacketing insulator 16 and the surrounding portion of the soldering point, the high temperature portions of both the resistance rod and the soldering point are shielded from the air so as to prevent oxidation. The heated portion of the carbon rod operates at a much higher temperature than the soldering point due to the fact that the soldering point obtains its heat by conduction and is continually radiating heat as well as conducting it to the work. The rod, therefore, has a greater tendency to oxidize, and would be rapidly burned away if it were not shielded from the air. Upon the completion of the soldering operation, the removal of the soldering iron from the work breaks the electric heating circuit.

It will be observed that by means of my invention I have provided a soldering iron which is heated only when it is being used and in which the generated heat is transmitted efficiently to the working surface. The soldering iron is thus made very economical in its use of electrical energy. But few parts are used in the construction of the iron, and these parts are simple and rugged so that the iron is particularly adapted to withstand rough usage.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:—

1. An electrically heated tool comprising a rod having a portion at one end adapted to generate heat, and a heated body secured in engagement with said portion so as to be included with said rod in an electric heating circuit and be heated by conduction from said portion.

2. An electrically heated tool comprising a rod of resistance material forming a heating element, a handle for said rod, and a heated body carried by said rod in electrically conducting relation therewith so as to complete the heating circuit therefor when moved into engagement with the work and be heated by conduction from said rod.

3. An electrically heated tool comprising a rod of resistance material having a portion of reduced section adapted to generate heat, and a heated body secured in engagement with said portion so as to form a part of an electric heating circuit for said rod and be heated by conduction from said portion of reduced section.

4. An electrically heated tool comprising a rod of resistance material having a portion of reduced section adapted to generate heat, and a heated body secured in engagement with said portion so as to complete an electric heating circuit for said rod when brought into engagement with the work and be heated by conduction from said portion of reduced section.

5. An electrically heated tool comprising a rod having portion at one end of reduced section adapted to generate heat, a heated body secured in engagement with said portion so as to form a part of the heating circuit thereof and be heated by conduction therefrom, and protecting means for excluding air from said rod to prevent oxidation thereof.

6. An electrically heated tool comprising a rod of resistance material having a portion of reduced section adapted to generate heat, and a heated body enclosing said portion and secured in engagement therewith so as to complete an electric heating circuit for said rod when brought into engagement with the work and be heated by conduction from said portion of reduced section.

7. An electrically heated tool comprising a rod of resistance material having a portion of reduced section adapted to generate heat, an insulating jacket surrounding said rod, and a heated body surrounding said jacket and in electrically conducting relation with said portion of reduced section so as to complete an electric circuit for said rod when brought into engagement with the work and be heated by conduction from said portion of reduced section.

8. An electrically heated tool comprising a rod of resistance material having a portion at one end of reduced section adapted to generate heat, a handle secured to the other end of said rod, an insulating jacket surrounding the central portion of said rod, and a heated body surrounding said jacket and secured in engagement with the portion of reduced section so as to complete an electric heating circuit for said rod when brought into engagement with the work and be heated by conduction from said portion of reduced section.

In witness whereof, I have hereunto set my hand this 1st day of December, 1921.

EDWARD A. WAGNER.